G. STETTLER.
POWER TRANSMITTING MECHANISM.
APPLICATION FILED NOV. 16, 1909.
1,066,673.
Patented July 8, 1913.
2 SHEETS—SHEET 2.
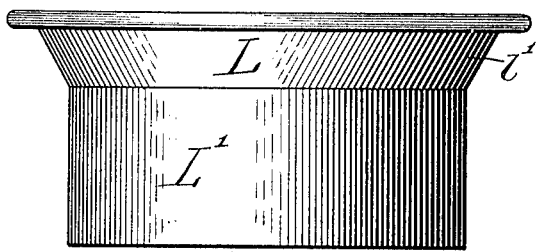
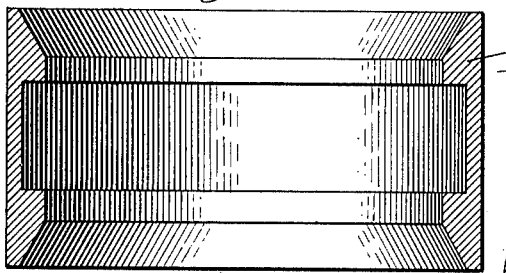
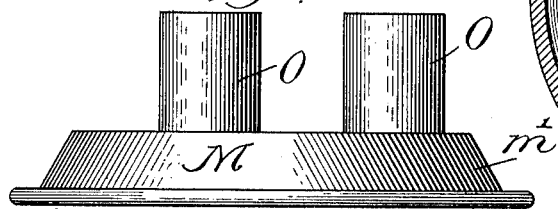
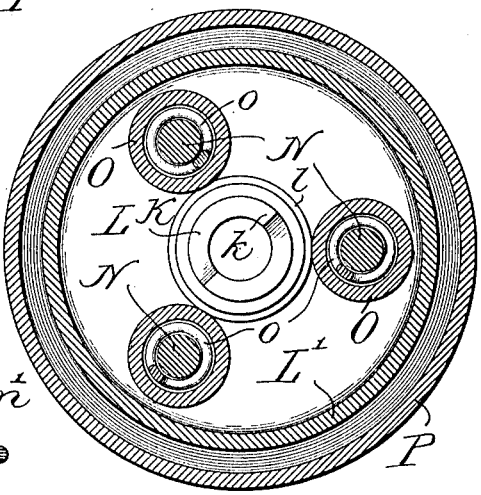
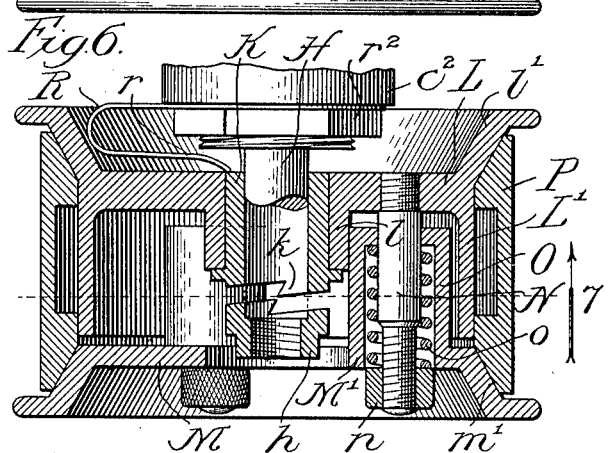
Witnesses:
John Enders
Chas. H. Buell
Inventor:
Gottfred Stettler.
By Sheridan, Wilkinson & Scott,
Attys.
COLUMBIA PLANOGRAPH CO., WASHINGTON, D. C.

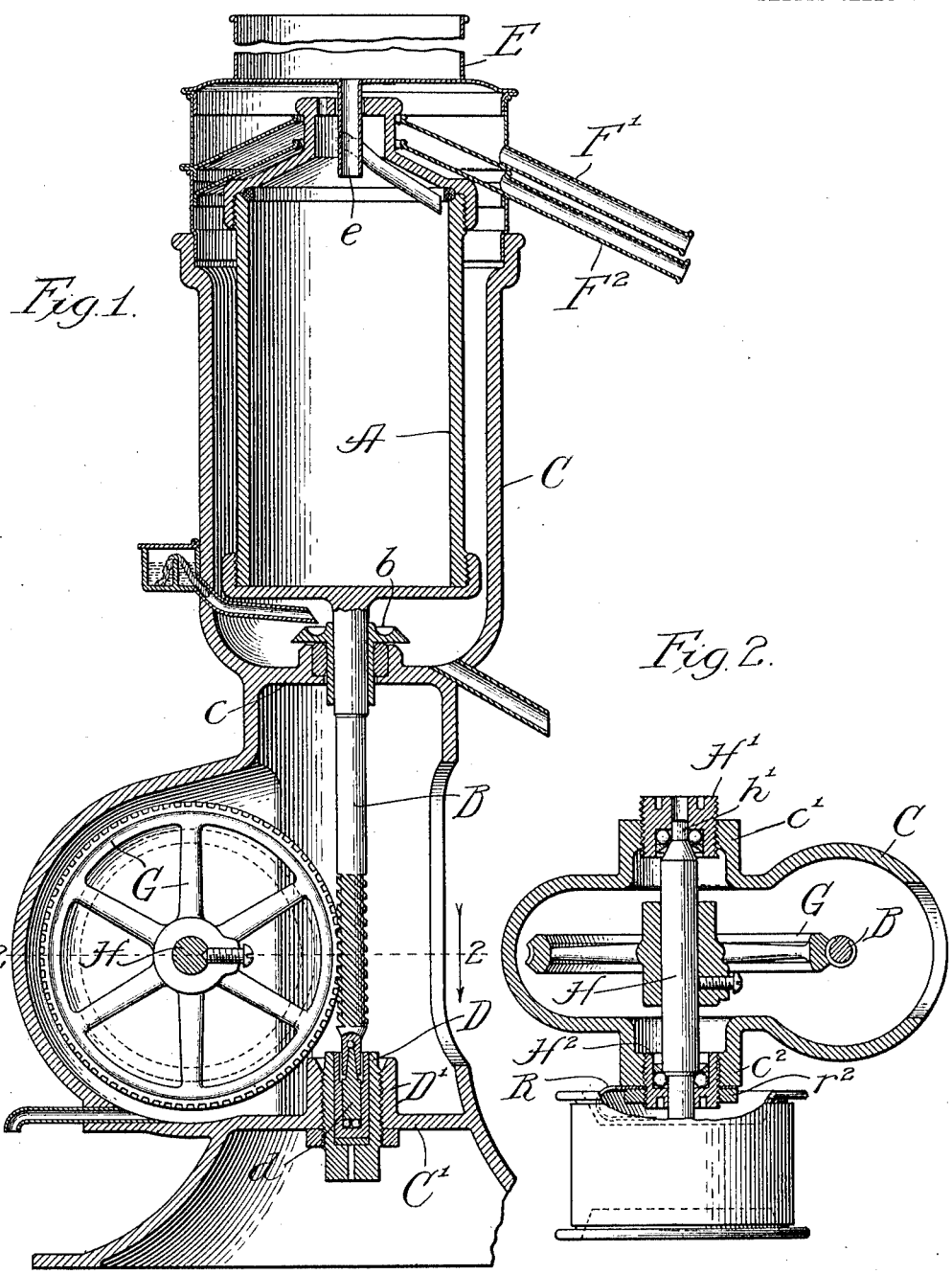

UNITED STATES PATENT OFFICE.

GOTTFRED STETTLER, OF GOSHEN, INDIANA, ASSIGNOR TO NATIONAL DAIRY MACHINE COMPANY, A CORPORATION OF INDIANA.

POWER-TRANSMITTING MECHANISM.

1,066,673.                      Specification of Letters Patent.         Patented July 8, 1913.

Application filed November 16, 1909. Serial No. 528,277.

*To all whom it may concern:*

Be it known that I, GOTTFRED STETTLER, a citizen of the United States, residing at Goshen, in the county of Elkhart and State of Indiana, have invented certain new and useful Improvements in Power - Transmitting Mechanism, of which the following is a specification.

My invention relates in general to power transmitting mechanism, and more particularly to improved driving mechanism for rotating centrifugal cream separators.

In the operation of centrifugal cream separators, it is desirable that the bowl should be initially rotated by gradually increasing speed until the maximum speed is attained, and also that the rotation of the bowl should be gradually discontinued, inasmuch as sudden starting or stopping of the bowl not only tends to waste the milk by splashing it out of the bowl, but is also liable to cause the supporting spindle of the bowl to jump out of its lower bearing.

The primary object of my invention is to provide centrifugal cream separators with improved driving mechanism interposed between the spindle of the bowl and the belt or other power transmitting means, which will impart to the bowl a gradually increasing speed of rotation in starting and a gradually decreasing speed in stopping, regardless of the speed of the belt or means for transmitting power to the separator.

A further object of my invention is to provide an improved friction clutch pulley, particularly adapted for use for communicating rotary motion to the bowl of a centrifugal cream separator, which will increase the efficiency of operation of the separator, will avoid waste of milk, and will obviate the subjection of the bowl supporting spindle to excessive strain in starting or stopping the rotation of the bowl.

A still further object of my invention is to provide improved driving mechanism for centrifugal cream separators, which will be simple in construction, durable in operation, and efficient in use.

My invention will be more fully described hereinafter with reference to the accompanying drawings, in which the same is illustrated as embodied in a convenient and practical form, and in which—

Figure 1 is a vertical central section through a centrifugal cream separator, in connection with which my improvement is disclosed; Fig. 2, a cross sectional view on line 2, 2, Fig. 1; Fig. 3, a plan view of one of the side members of the driving pulley; Fig. 4, a central horizontal section through the surrounding intermediate member of the pulley; Fig. 5, a plan view of the other side member of the pulley; Fig. 6, a central horizontal section through the center of the driving mechanism consisting of the pulley, intermediate clutch, and driven shaft; and Fig. 7, a sectional view on line 7, Fig. 6.

The same reference characters are used to designate the same parts in the several figures of the drawings.

Reference letter A indicates the bowl of the separator, which is supported upon the upper end of a vertical spindle B.

C designates the surrounding casing of the separator within which the bowl is inclosed and upon which the driving mechanism is supported.

$c$ indicates a web formed integral with the casing C and through which rotatably extends the spindle B.

C' indicates a bottom web of the casing C, also preferably formed integral therewith.

The lower end of the spindle B is provided with a conical recess which rotatably fits upon the conical upper end of a bearing $d$. The bearing $d$ is suitably supported within a hollow nut D extending through and in screw threaded engagement with a circular flange D' projecting upwardly from the web C'.

E indicates the receiving chamber at the top of the separator into which is delivered the milk. F' and F² indicate the discharge spouts for the cream and skimmed milk, respectively.

G designates a worm wheel which meshes with a worm formed on the spindle B. The worm wheel G is fixed upon a shaft H, the ends of which are rotatably supported in anti-friction bearings mounted in the opposite walls of the lower portion of the casing C. The reduced end $h'$ of the shaft H extends within a surrounding bearing H' in screw threaded engagement with an outwardly projecting flange $c'$ on the wall of the casing C, anti-friction rollers being interposed between the end of the shaft and the bearing H'. The opposite end of the shaft H extends through an adjustable bearing H² extending through and in screw threaded engagement with the flange $c^2$ projecting from the opposite wall of the casing C, anti-friction rollers being interposed between a shoulder on the shaft and an opposing shoulder within the bearing $H^2$.

The portion of the shaft H which projects through the bearing $H^2$ has fixed on the end thereof a clutch-nut $h$ having inwardly directed inclined teeth thereon. Surrounding the shaft H intermediate of the clutch-nut $h$ and the bearing $H^2$ is a friction clutch pulley which transmits power from a suitable source thereof to the shaft H.

The friction clutch pulley comprises side members L and M between which is supported a pulley rim P. The side member L is provided with a conical flange $l'$, while the opposite side member M is provided with a similar conical flange $m'$. The under surface of the pulley rim P is provided with conical surfaces at its sides which surround and frictionally engage the outer conical surfaces of the flanges $l'$ and $m'$, thereby connecting the pulley rim with the side members of the pulley by means of conical clutches. In order that the friction between the conical clutching surfaces on the pulley rim and side members of the pulley may be adjusted, the side members of the pulley are so connected as to be drawn together by a variable yielding pressure. This connection in the embodiment of my invention illustrated in the drawings consists of a plurality of rods N, each secured at one end to the side member L of the pulley, and all located within and extending parallel with the cylindrical flange $L'$ of the pulley member L around which the pulley rim is located. Each of the rods N extends within a cylindrical chamber O projecting inwardly from the side member M of the pulley. A spring $o$ surrounds each rod N and bears at one end against the annular end wall of the surrounding cylindrical chamber O, and at its other end against a nut $n$ adjustably engaging the screw threaded outer end of the corresponding rod N.

A bushing K is fixed within a hub $l$ on the side member L of the pulley, and rotatably surrounds the shaft H. The end of the bushing K adjacent the clutch-nut $h$ is provided with inclined teeth complementary to the teeth on the clutch-nut. A leaf spring R is interposed between the pulley and the casing C, the tension of which normally retains the teeth on the bushing K in mesh with the teeth on the clutch-nut $h$. The spring R may be conveniently secured at one end to the casing A by having an opening therein through which the bearing $H^2$ extends, a lock nut $r^2$ serving, through threaded engagement with the nut $H^2$, to clamp the spring R against the flange $c^2$ on the casing. The opposite end $r$ of the spring R bears against the inner surface of the side member L of the pulley.

In the operation of a centrifugal separator embodying my improved driving mechanism a power belt surrounds the pulley rim P and also surrounds a power driven pulley, which need not be shown in order that a clear understanding of my invention may be had. The pulley rim P is rotated by the power belt, and such rotary motion is communicated through the engagement of the pulley rim with the conical flanges on the side members of the pulley to the bushing K and through the engaged inclined teeth on the bushing with the inclined teeth on the clutch-nut $h$, to the shaft H. The rotary movement thus imparted to the shaft H is communicated to the worm wheel G, and thence to the vertical spindle B upon the upper end of which the bowl A is supported.

The sudden starting of the belt around the pulley rim P causes the pulley rim to rotate relatively to the side members of the pulley, and to gradually impart a rotary motion to the pulley side members through the conical friction clutches afforded by the conical engaging surfaces between the pulley rim and side members of the pulley. The sudden rotary movement imparted to the pulley rim is, therefore, not directly communicated to the bowl, but is yieldingly transmitted so that the bowl will have imparted to it an initially slow but gradually increasing speed. If for any reason the driving belt be suddenly arrested, the bowl will not be instantly brought to a standstill, inasmuch as the side members of the pulley will continue to rotate by momentum relatively to the pulley rim until the friction between the pulley rim and the side members of the pulley have gradually checked the rotation of the bowl. The sudden stopping of the rotation of the bowl, should the driving belt suddenly stop, is also prevented by connecting the pulley with the shaft H by the inclined teeth on the clutch-nut $h$ and bushing K. Should the pulley suddenly cease to rotate, the momentum of the bowl will cause the clutch-nut $h$ to rotate relatively to the bushing K, the inclined teeth on the clutch-nut and bushing serving to force the pulley inwardly against the tension of the spring R.

The desired frictional resistance between the pulley rim and side members of the pulley may be readily adjusted by means of the nuts $n$ on the ends of the several rods N. By rotating the nuts $n$, the tension of the respective springs $o$ is regulated, and consequently the pressure with which the side members of the pulley are drawn together is correspondingly varied.

From the foregoing description, it will be observed that I have invented an improved driving mechanism for centrifugal cream separators, by means of which the danger of the sudden starting or stopping of the bowl is entirely avoided and the objections incident thereto eliminated. It will be further evident that the improved friction clutch pulley which I have invented for transmitting the necessary power to the bowl to rotate the same comprises all metal parts, and consequently no leather which must be renewed; comprises frictionally engaging parts which are self-adjusting as all wear between the sliding parts will be automatically taken up; which can be readily lubricated; and in which the friction can be easily adjusted.

While I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient.

I claim:

1. The combination with a driving element, of a driven element, friction means interposed between and yieldingly connecting said elements, and means intermediate of and non rotatively connecting said friction means and said driven element when the driven element rotates in one direction and permitting the driven element to continue its rotation upon the sudden retardation of said friction means.

2. The combination with a driven shaft, of a pulley loosely mounted thereon and comprising a rim, frictionally engaging side members, and means non-rotatively connecting said pulley to said shaft when the shaft rotates in one direction and permitting the shaft to continue its rotation upon the sudden retardation of said pulley.

3. The combination with a driven shaft, of a pulley mounted thereon and comprising a rim, frictionally engaging side members, and a hub loosely surrounding said shaft, a clutch comprising one member fixed to said shaft and another member carried by said hub, and means for normally retaining said clutch members in engagement so as to rotate said shaft but permitting the shaft to continue its rotation upon the sudden retardation of said pulley.

4. The combination with a driven shaft, of a pulley mounted thereon and comprising a rim, frictionally engaging side members and a hub loosely surrounding said shaft, a clutch comprising one member fixed to said shaft and another member carried by said hub, and a spring interposed between said shaft and the hub of said pulley for normally retaining said clutch members in engagement so as to rotate said shaft and for permitting an axial movement of said hub relatively to said shaft to disengage the members of said clutch and permit said shaft to continue its rotation upon the sudden retardation of said pulley.

5. The combination with a driven shaft, of a pulley mounted thereon and comprising a rim, surrounding and frictionally engaging side members, rods secured to one side member and projecting through chambers extending inwardly from the other side member, springs surrounding said rods and inclosed by said chambers, and projections on said rods between which and the inner end of said chambers said springs are compressed, thereby yieldingly drawing said side members together.

In testimony whereof, I have subscribed my name.

GOTTFRED STETTLER.

Witnesses:
Edgar O. Lehman,
Le Roy L. Baker.

---

Copies of this patent may be obtained for five cents each, by addressing the "Commissioner of Patents, Washington, D. C."